(12) United States Patent
Lambert et al.

(10) Patent No.: US 11,899,600 B2
(45) Date of Patent: Feb. 13, 2024

(54) SERIAL CONNECTOR ADAPTER SYSTEM

(71) Applicant: Dell Products L.P., Round Rock, TX (US)

(72) Inventors: Timothy M. Lambert, Austin, TX (US); Jeffrey L Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 206 days.

(21) Appl. No.: 17/583,604

(22) Filed: Jan. 25, 2022

(65) Prior Publication Data

US 2023/0237001 A1 Jul. 27, 2023

(51) Int. Cl.
*G06F 13/38* (2006.01)
*G06F 13/42* (2006.01)

(52) U.S. Cl.
CPC ........ *G06F 13/382* (2013.01); *G06F 13/4282* (2013.01); *G06F 2213/0012* (2013.01); *G06F 2213/0042* (2013.01); *G06F 2213/38* (2013.01)

(58) Field of Classification Search
CPC ............... G06F 13/382; G06F 13/4282; G06F 2213/0012; G06F 2213/0042; G06F 2213/38; G06F 13/385
USPC ........................................................ 375/257
See application file for complete search history.

(56) References Cited

U.S. PATENT DOCUMENTS

| | | | | |
|---|---|---|---|---|
| 11,556,487 B1* | 1/2023 | Norton, Jr. | ............ | G06F 13/382 |
| 2003/0052547 A1* | 3/2003 | Fischer | ................ | H02J 7/0045 |
| | | | | 307/154 |
| 2008/0140887 A1* | 6/2008 | Gallant | ............... | G06F 13/4081 |
| | | | | 710/100 |
| 2013/0159559 A1* | 6/2013 | Hess | ...................... | G06F 13/385 |
| | | | | 710/14 |
| 2013/0290746 A1* | 10/2013 | Lee | ........................... | G06F 1/26 |
| | | | | 713/300 |
| 2015/0303724 A1* | 10/2015 | Lin | ........................ | H02J 7/007 |
| | | | | 439/660 |
| 2016/0349814 A1* | 12/2016 | Carpenter, Jr. | ......... | G06F 1/266 |
| 2023/0152877 A1* | 5/2023 | Kadam | ................... | G06F 1/263 |
| | | | | 713/320 |

* cited by examiner

Primary Examiner — Emmanuel Bayard
(74) Attorney, Agent, or Firm — Joseph Mencher

(57) ABSTRACT

A serial connector adapter system includes a serial connector adapter device connected to a computing device. The serial connector adapter device includes a serial communication request subsystem coupled to a serial connector and a first USB connector. The computing device includes a second USB connector connected to the first USB connector, a serial communication subsystem coupled to the second USB connector, and a serial communication configuration subsystem coupled to the second USB connector and the serial communication subsystem. The serial communication configuration uses a USB ground drain connection in the first and second USB connectors subsystems to identify the serial connector adapter device and perform bi-directional communications to receive a request for serial communications with the serial communication subsystem and, in response, configures the serial communication subsystem to perform serial communications via the serial connector using USB transmitter/receiver pair connections in the first and second USB connectors.

20 Claims, 12 Drawing Sheets

SERIAL CONNECTOR ADAPTER SYSTEM

BACKGROUND

The present disclosure relates generally to information handling systems, and more particularly to an adapter system for enabling serial communications with an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Over time, particular features provided on information handling systems such as, for example, server devices, are phased out (also referred to as "sunsetting") as new technologies allow those features to be replaced. For example, the RS232 DB9 serial port ("the DB9 serial connector") is a legacy technology that was developed in the 1960's for use in performing serial communications, but Universal Serial Bus (USB) technologies now perform many of the functions enabled via DB9 serial connectors. However, many users still desire the DB9 serial connector with "lights out" serial communication support (e.g., supporting the performance of serial communications when the server device is in low/no power state) for serial communications with both the host subsystem and non-host subsystems in the server device, as well as flow control/modem support due to, for example, the established base of installed serial concentrator applications and serial-only management systems. Providing such legacy features on server devices presents a variety of issues.

For example, one option for providing a DB9 serial connector on a server device is via a PCIe card, but PCIe slots in server devices are limited in number and in high demand to provide other functionality for the server device, and thus utilizing a PCIe slot to provide a DB9 serial connector on a server device is generally not acceptable to users. Furthermore, server device densities have increased to a point where there are few (if any) available locations for a DB9 serial connector on the outer surface of the server device, and conventional server devices sometimes provide a chassis "punch-out" that allows a DB9 serial connector to be cabled to the server device. However, such solutions add cost to the "base" server device (i.e., the server device that does not utilize the DB9 serial connector but still requires the configuration/components/manufacturing operations to support it), and may prevent the ability to provide other features (due to the space required to support the DB9 serial connector). Finally, USB-to-serial adapters (or "dongles") exist that can connect to a host USB port and provide a DB9 serial port connection, but conventional USB-to-serial adapters only provide "lights on" support (i.e., when the server device is fully powered) for serial communications with the host subsystem (via an operating system) in the server device, and thus do not enable a variety of serial communication functionality desired by users as discussed above.

Accordingly, it would be desirable to provide serial connector adapter system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a serial communication configuration engine that is configured to: identify, via a USB ground drain connection in a first USB connector coupled to the processing system and a second USB connector that is connected to the first USB connector, a serial connector adapter device that includes the second USB connector; receive, using bi-directional communications with the serial connector adapter device via the USB ground drain connection in the first USB connector and the second USB connector, a request for serial communications with a serial communication subsystem that is coupled to the processing system; and configure, in response to receiving the request for serial communications with the serial communication subsystem, the serial communication subsystem to perform serial communications via a serial connector included on the serial connector adapter device using one or more USB transmitter/receiver pair connections in the first USB connector and the second USB connector.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
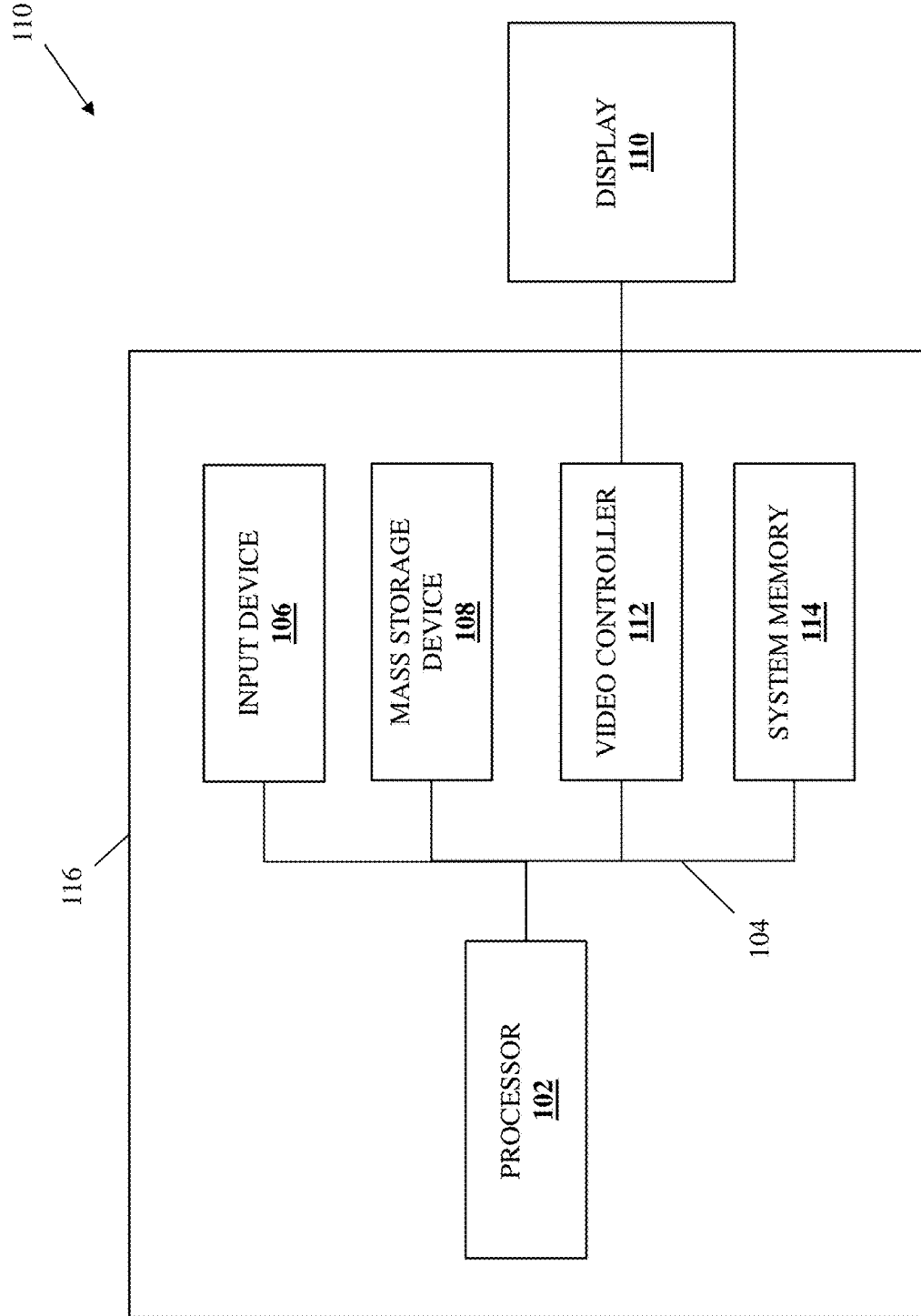
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
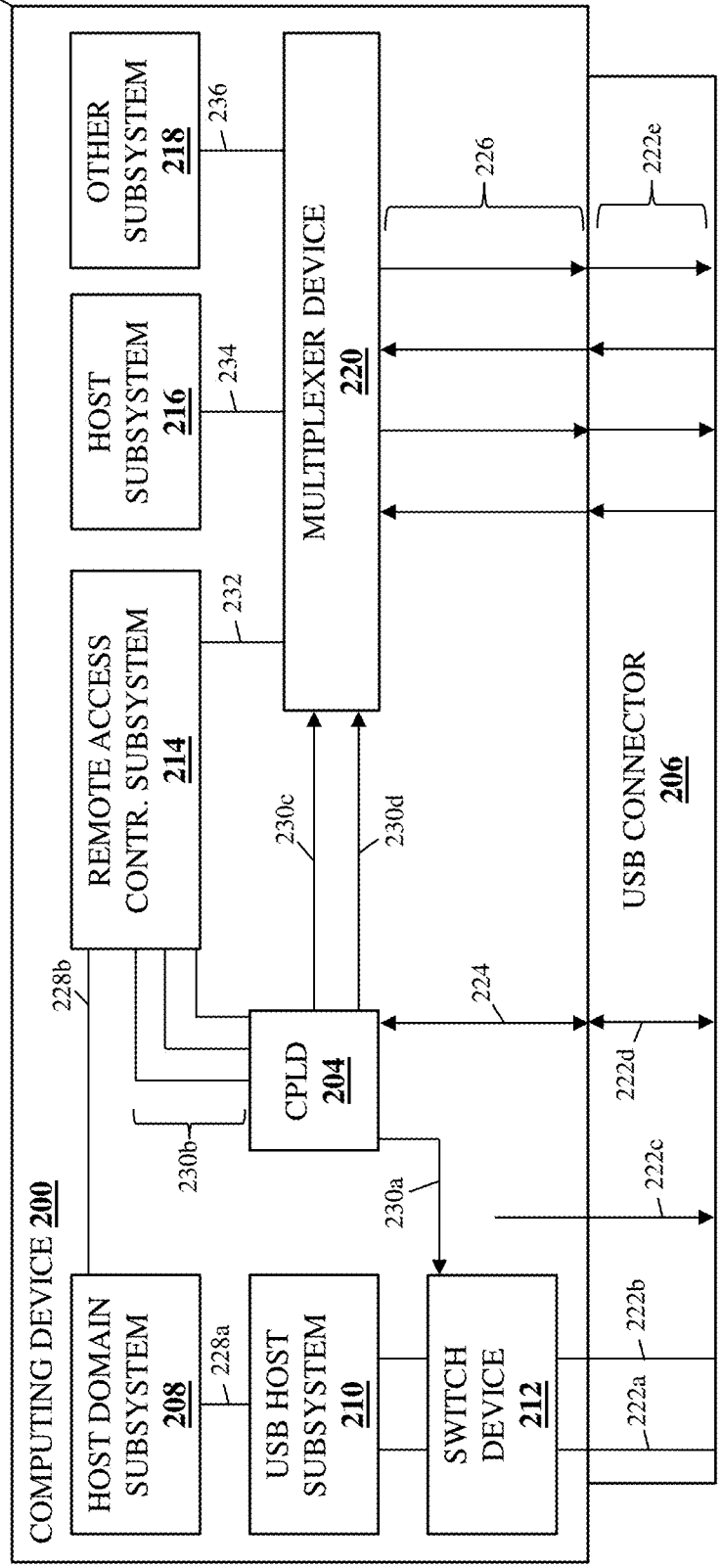
FIG. 2 is a schematic view illustrating an embodiment of a computing device that may include the serial connector adapter system of the present disclosure.

Referring now to FIG. 2, an embodiment of a computing device 200 is illustrated that may provide a portion of the serial connector adapter system of the present disclosure. In an embodiment, the computing device 200 may be provided by the IHS 100 discussed above with reference to FIG. 1 and/or may include some or all of the components of the IHS 100, and in specific examples may be provided by a server device. However, while described as a server device, the computing device 200 may be provided by desktop computing devices, laptop/notebook computing devices, and/or other computing devices that one of skill in the art in possession of the present disclosure would recognize as benefitting from the teachings of the present disclosure.

In the illustrated embodiment, the computing device 200 includes a chassis 202 that houses the components of the computing device 200, only some of which are illustrated and described below. For example, the chassis 202 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide a serial communication configuration engine that is configured to perform the functionality of the serial communication configuration engines/subsystems and/or computing devices discussed below. In the examples below, the serial communication configuration engine/subsystem is provided by a Complex Programmable Logic Device (CPLD) 204, but one of skill in the art in possession of the present disclosure will appreciate how the serial communication configuration engine/subsystem may be provided using other processing/memory components while remaining within the scope of the present disclosure as well. The chassis 202 also includes a USB connector 206 that may be accessible on an outer surface (e.g., a front surface) of the chassis 202. In the examples below, the USB connector 206 is provided by a USB 3.1 Type A connector, although the techniques described herein may be beneficial to other types of connectors, and thus those connectors are envisioned as falling within its scope as well.

The chassis 202 may also house a host domain subsystem 208, a USB host subsystem 210, and a switch device 212 (e.g., a USB switch device) that one of skill in the art in possession of the present disclosure will appreciate may be configured to provide a variety of USB functionality via the USB connector 206. The chassis 202 may also house a one or more serial communications subsystems, with the illustrated embodiments including a remote access controller subsystem 214, a host subsystem 216, and an other subsystem 218 that may each be configured to perform serial communications as discussed below. In different embodiments, the remote access controller subsystem 214 may be provided by an integrated DELL® Remote Access Controller (iDRAC) available in server devices provided by DELL® Inc. of Round Rock, Texas, United States; a Baseboard Management Controller (BMC), and/or other remote access controller subsystems known in the art. In an embodiment, the host subsystem 216 may be provided by an operating system, although other host subsystem that are configured to perform serial communications will fall within the scope of the present disclosure as well. Finally, the other subsystems 218 may be provided by a system Complex Programmable Logic Device (CPLD) (which may be separate from the CPLD 204 discussed in further detail below), a Data Processing Unit (DPU) such as a Smart Network Interface Controller (SmartNIC), other peripheral devices with Universal Asynchronous Receiver/Transmitter (UART) debugging or monitoring port functionality, and/or other serial communications subsystems that would be apparent to one of skill in the art in possession of the present disclosure. The chassis 202 also houses a multiplexer device 220 that, as discussed below, allows any of the serial communication subsystems to be configured to perform serial communications via the USB connector 206.

In the specific examples provided below, the USB connector 206 includes a plurality of conventional USB connections, including a USB D− connection 222a and a USB D+ connection 222b, each of which is connected to the switch device 212, and a 5V auxiliary power connection 222c that may be provided from a power system in the computing device 200 (not illustrated). Furthermore, the plurality of conventional USB connections in the USB connector 206 also include a USB ground drain connection 222d, as well as a plurality of USB transmitter/receiver pair connections 222e. As discussed in further detail below, the conventional USB ground drain connection 222d (e.g., a USB "GND_DRAIN" connection provided by pin 7 in conventional USB 3.1 Type A connectors) and USB transmitter/receiver pair connections 222e (e.g., USB "TX/RX" pair connections) are repurposed in the serial connector adapter system of the present disclosure in order to enable serial communications. As will be appreciated by one of skill in the art in possession of the present disclosure, the USB ground drain connection is placed between "super-speed" transmitter/receiver differential pairs in conventional USB 3.1 Type A connectors, is not insulated from shields on those "super-speed" transmitter/receiver differential pairs, and makes contact with the shields on those super-speed" transmitter/receiver differential pairs simultaneously, which conventionally operates to provide a low impedance path to ground so that voltage is not accumulated on the shields of those "super-speed" transmitter/receiver differential pairs that have no direct pin assignment on the USB connector.

In the illustrated embodiments provided below, the CPLD 204 is connected to the USB ground drain connection 222d by a one-wire-data connection 224 that allows the CPLD 204 to identify serial connector adapter devices and perform bi-directional communications with serial connector adapter devices via the USB ground drain connection 222. Furthermore, the multiplexer device 220 is connected to the USB transmitter/receiver pair connections 222e by Universal Asynchronous Receiver/Transmitter (UART) connections 226 (e.g., a UART transmitter connection, a UART receiver connection, a UART Clear To Send (CTS) connection, and a UART Request To Send (RTS) connection) that allow the multiplexer device 220 to configure any of the serial communication subsystems to perform serial communications with serial connector adapter devices via the USB transmitter/receiver pair connections 222e as discussed in further detail below.

In the specific example illustrated in FIG. 2, the host domain subsystem 208 is connected to the USB host subsystem 210 by a Peripheral Component Interface express (PCIe) connection 228a, and to the remote access controller subsystem 214 by an enhanced Serial Peripheral Interface (eSPI) connection 228b. Furthermore, the CPLD 204 is connected to the switch device 212 by a switch enable connection 230a, to the remote access controller subsystem 214 by modem control connections 230b (e.g., a Ring Indicate (RI) connection, a Data Carrier Detect (DCD) connection, a Data Terminal Ready (DTR) connection, etc.), and to the multiplexer device 220 by each of a multiplexer select connection 230c and a multiplexer enable connection 230d.

In the specific example illustrated in FIG. 2, each of the serial communication subsystems may be connected to the multiplexer device 220 by at least some of the UART connections that connect the multiplexer device 220 to the USB transmitter/receiver pair connections 222e in the USB connector 206. For example, the remote access controller subsystem 214 may be connected to the multiplexer device 220 by a plurality of UART connections 232 (e.g., a UART transmitter connection, a UART receiver connection, a UART CTS connection, and a UART RTS connection), the host subsystem 216 may be connected to the multiplexer device 220 by a plurality of UART connections 234 (e.g., a UART transmitter connection and a UART receiver connection), and the other subsystem 216 may be connected to the multiplexer device 220 by a plurality of UART connections 236 (e.g., a UART transmitter connection and a UART receiver connection). However, while a specific computing device has been illustrated and described, one of skill in the art in possession of the present disclosure will appreciate how the computing device 200 may include other components and/or configurations for providing the functionality described below while remaining within the scope of the present disclosure as well.

Figure 3:
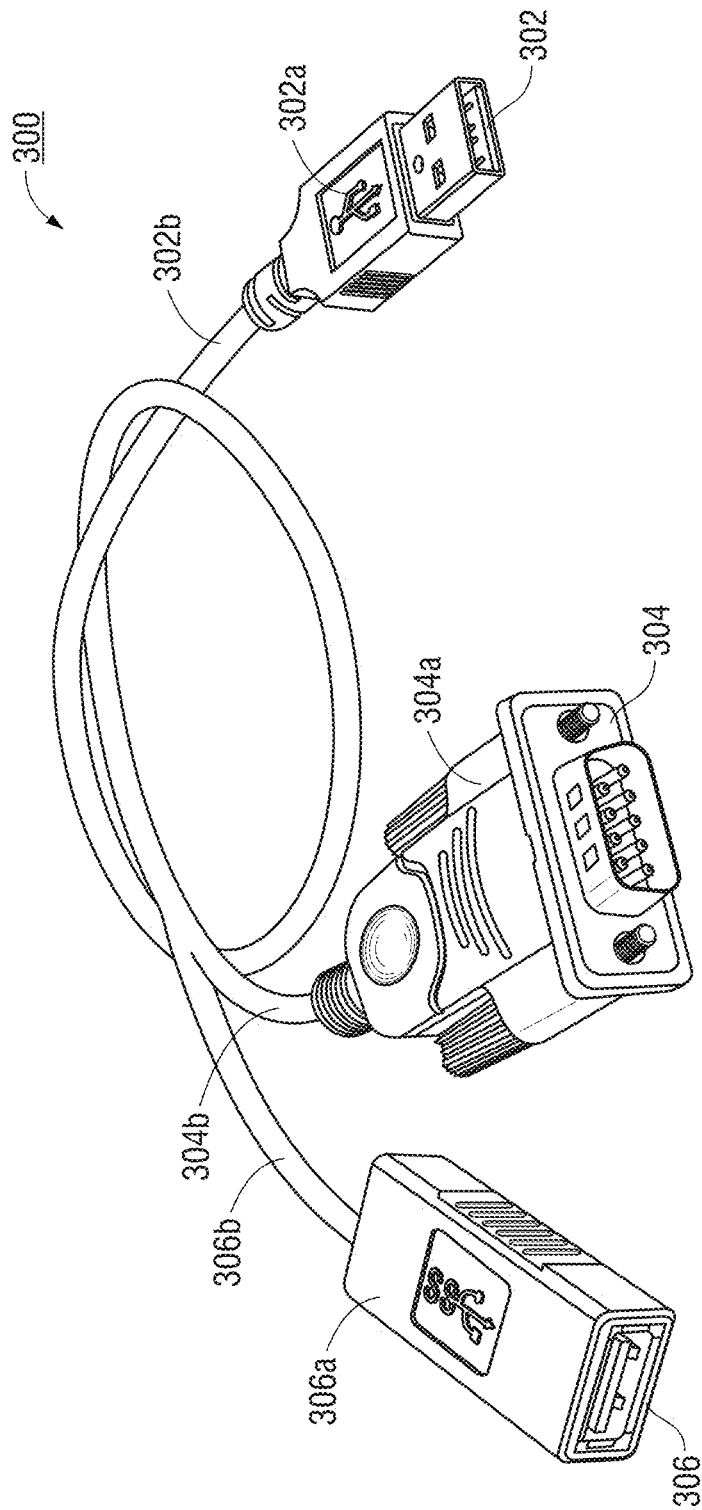
FIG. 3 is a perspective view illustrating an embodiment of a serial connector adapter device.

With reference to FIG. 3, an embodiment of a serial connector adapter device 300 is illustrated that one of skill in the art in possession of the present disclosure will recognize provides one example of a physical embodiment of the serial connector adapter device that may provide a portion of the serial connector adapter system of the present disclosure. In the illustrated embodiment, the serial connector adapter device 300 includes a USB Type A male connector 302 having a USB Type A male connector chassis 302a and a first cable portion 302b extending from the USB Type A male connector chassis 302a, a DB9 male connector 304 having a DB9 male connector chassis 304a and a second cable portion 304b extending from the DB9 male connector chassis 304a, and a USB Type A female connector 306 having a USB Type A female connector chassis 306a and a third cable portion 306b extending from the USB Type A female connector chassis 306a. In the illustrated embodiment, the first cable portion 302b "splits" into the second cable portion 304b and the third cable portion 306b, which as discussed below allows the USB Type A male connector 302 to connect to the USB connector 206 on the computing device 200 in order to enable the connection of devices to the DB9 male connector 304 and/or the USB Type A female connector 306.

However, while particular USB and serial connectors are illustrated and described in FIG. 3, one of skill in the art in possession of the present disclosure will appreciate how other types of connectors may benefit from the teachings of the present disclosure, and thus are envisioned as falling within its scope. Furthermore, one of skill in the art in possession of the present disclosure will appreciate how the USB Type A male connector chassis 302a, the DB9 male connector chassis 304a, the USB Type A female connector chassis 306a, the first cable portion 302b, the second cable portion 304b, and the third cable portion 306b on the serial connector adapter device 300 may be considered a "chassis" of the serial connector adapter device 300 that is configured to house the components of the serial connector adapter devices described herein.

Figure 4:
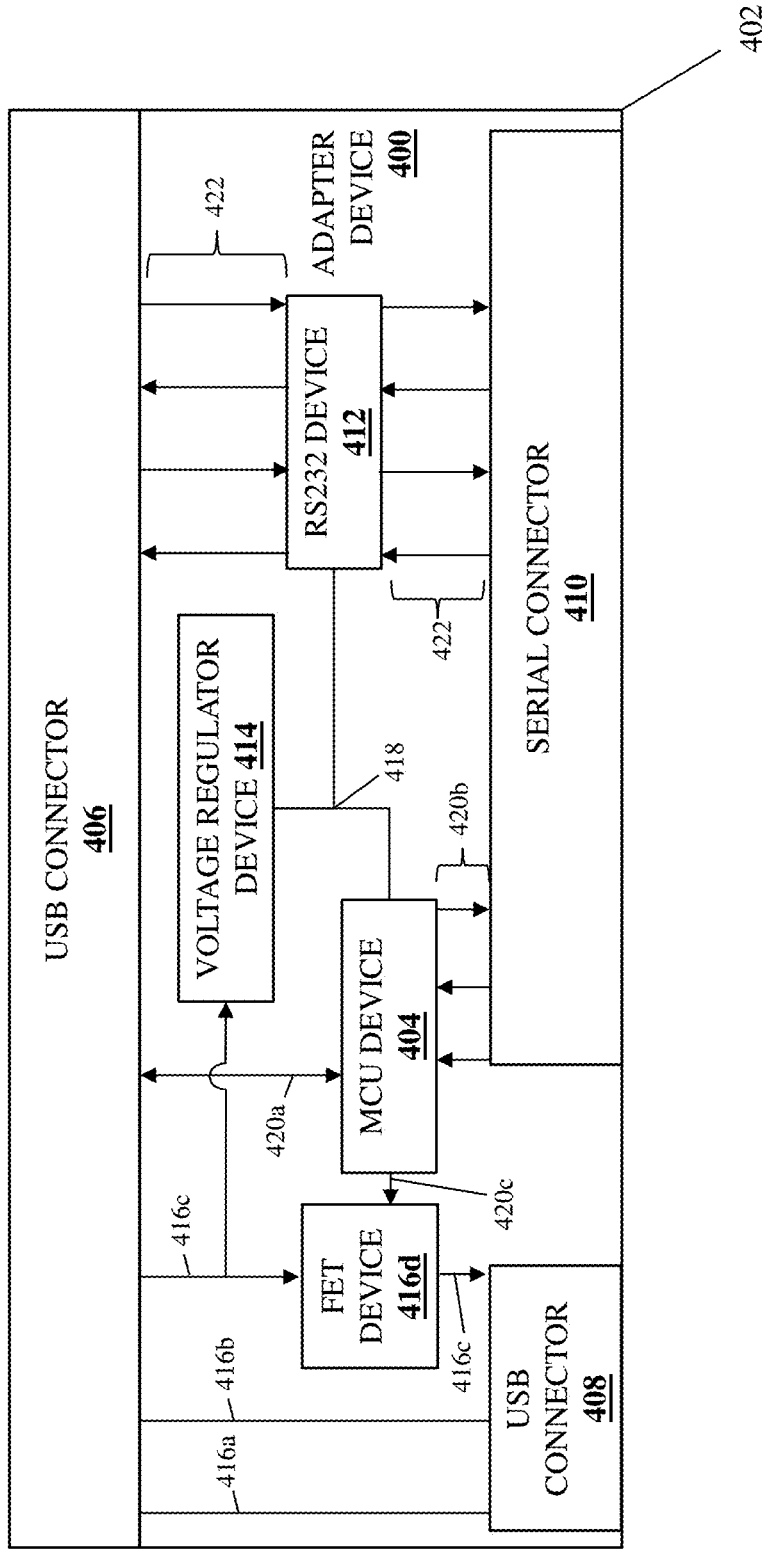
FIG. 4 is a schematic view illustrating an embodiment of a serial connector adapter device.

Referring now to FIG. 4, an embodiment of a serial connector adapter device 400, which may be the serial connector adapter device 300 discussed above with reference to FIG. 3, is illustrated that may provide a portion of the serial connector adapter system of the present disclosure. As will be appreciated by one of skill in the art in possession of the present disclosure, the serial connector adapter device 400 may be provided by a "dongle" that may couple to the IHS 100 discussed above with reference to FIG. 1. However, while illustrated and described as a "dongle", the serial connector adapter device 4000 may be provided in other configurations while remaining within the scope of the present disclosure as well.

In the illustrated embodiment, the serial connector adapter device 400 includes a chassis 402 that houses the components of the serial connector adapter device 400, only some of which are illustrated and described below. For example, the chassis 402 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide a serial communication request engine that is configured to perform the functionality of the serial communication request engines/subsystems and/or serial connector adapter devices discussed below. In the examples below, the serial communication request engine/subsystem is provided by a MicroController Unit (MCU) device 404, but one of skill in the art in possession of the present disclosure will appreciate how the serial communication request engine/subsystem may be provided using other components while remaining within the scope of the present disclosure as well. The chassis 402 also includes a USB connector 406 that is configured to connect to the USB connector 206 on the computing device 200 discussed above with reference to FIG. 2 (and thus includes similar conventional USB connections corresponding to those described above for the USB connector 206), and that may provide the USB Type A male connector 302 on the serial connector adapter device 300 discussed above with reference to FIG. 3.

The chassis 402 also includes a USB connector 408 that may provide the USB Type A female connector 306 on the serial connector adapter device 300 discussed above with reference to FIG. 3, and a serial connector 410 that may provide the DB9 male connector 304 on the serial connector adapter device 300 discussed above with reference to FIG. 3. The chassis 402 also includes an RS232 device 412 that is configured to facilitate serial communications via the serial connector 410, and a voltage regulator device 414 that is configured to power the MCU device 404 and the RS232 device 412 using power received via the USB connector 406 (e.g., a 3.3V voltage regulator device that is configured to convert 5V auxiliary power received via the USB connector 406 to 3.3V, and provide that 3.3V to the MCU device 404 and the RS232 device 412 in the examples below).

In the specific examples illustrated in FIG. 4, the USB connector 408 is connected to the USB connector 406 by a plurality of conventional USB connections, including a USB D− connection 416a, a USB D+ connection 416b, and a 5V auxiliary power connection 416c via a Field Effect Transistor (FET) device 416d, and one of skill in the art in possession of the present disclosure will recognize how the USB connections between the USB connectors 406 and 408 provide the USB connector 408 as a "USB passthrough" connector on the serial connector adapter device 400 in order to, for example, maintain USB functionality via the USB connector 206 even when the serial connector adapter device 400 is connected to the USB connector 206 on the computing device 200. Furthermore, using the specific example provided above, the voltage regulator device 414 may also be connected to the 5V auxiliary power connection 416c, as well as connected to each of the MCU device 404 and the RS232 device 412 by a 3.3V power connection 418.

In the specific examples illustrated in FIG. 4, the MCU device 404 is connected to the USB connector 406 by a one-wire-data connection 420a that allows the MCU device 404 to identify itself and perform bi-directional communications with computing devices via a USB ground drain connection as discussed in further detail below, as well as connected to the serial connector 410 by modem control connections 420b (e.g., an RI connection, a DCD connection, a DTR connection, etc.), and to the FET device 416d by a FET control connection 420c. The RS232 device 412 is connected to the serial connector 410 and the USB connector 406 by UART connections 422 (e.g., a UART transmitter connection, a UART receiver connection, a UART CTS connection, and a UART RTS connection). However, while a specific serial connector adapter device 400 has been illustrated and described, one of skill in the art in possession of the present disclosure will appreciate how the serial connector adapter device 400 may include other components and/or configurations for providing the functionality described below while remaining within the scope of the present disclosure as well.

Figure 5:
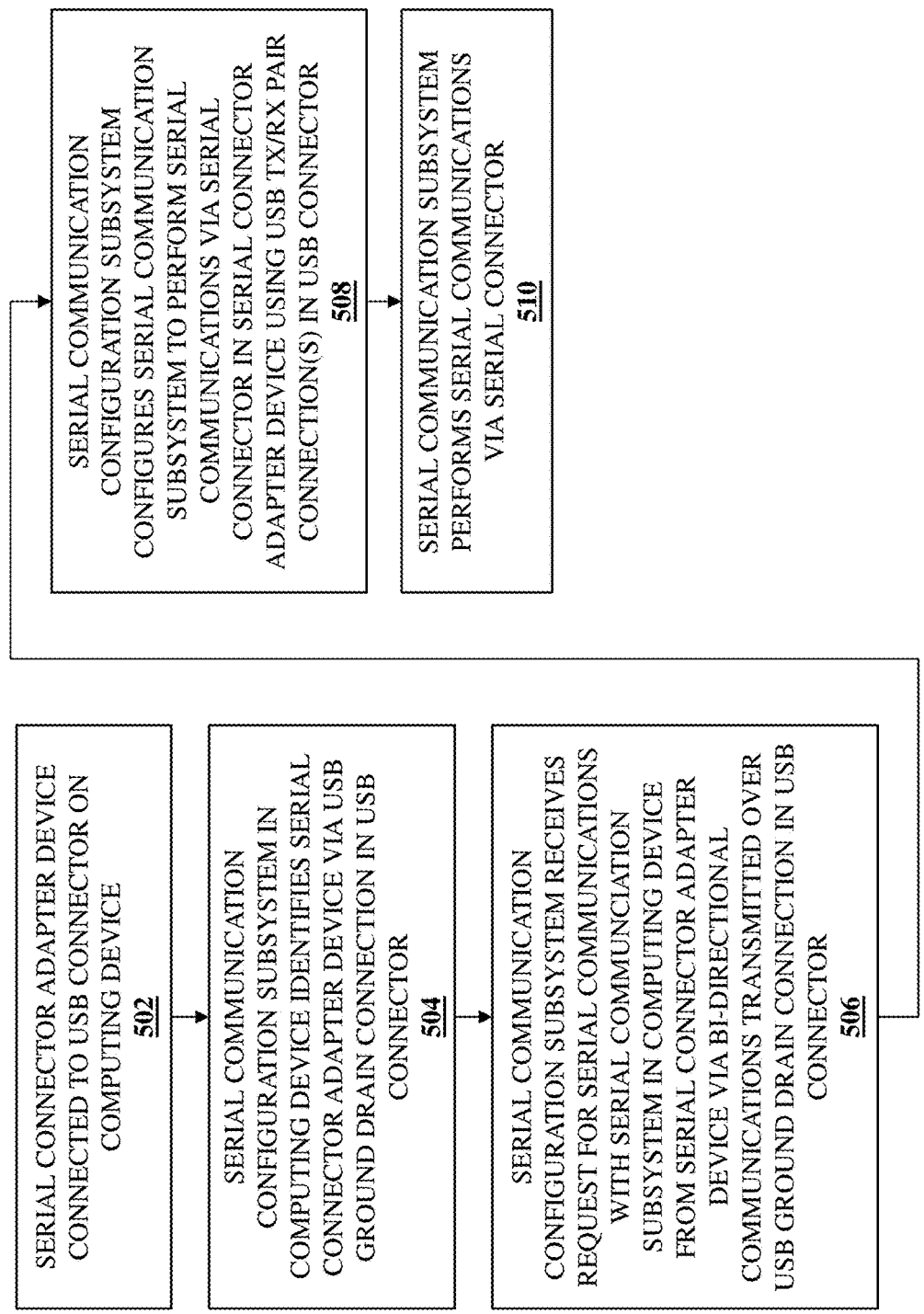
FIG. 5 is a flow chart illustrating an embodiment of a method for providing serial communications.

Referring now to FIG. 5, an embodiment of a method 500 for performing serial communications is illustrated. As discussed below, the systems and methods of the present disclosure provide for the performance of serial communications with a serial communication subsystem in a computing device via a USB connector on that computing device, with support for modem control communications, as well as "lights out" serial communications with both host and non-host subsystems in the computing device. For example, the serial connector adapter system of the present disclosure may include a serial connector adapter device connected to a computing device. The serial connector adapter device includes a serial communication request subsystem coupled to a serial connector and a first USB connector. The computing device includes a second USB connector connected to the first USB connector, a serial communication subsystem coupled to the second USB connector, and a serial communication configuration subsystem coupled to the second USB connector and the serial communication subsystem. The serial communication configuration uses a USB ground drain connection in the first and second USB connectors subsystems to identify the serial connector adapter device and perform bi-directional communications to receive a request for serial communications with the serial communication subsystem and, in response, configures the serial communication subsystem to perform serial communications via the serial connector using USB transmitter/receiver pair connections in the first and second USB connectors. As such, a USB connector may be utilized to perform serial communications without the limitations of conventional systems.

As discussed above, in some embodiments, the USB connector 206 on the computing device 200 may be provided by USB 3.1 connector, which one of skill in the art in possession of the present disclosure will appreciate supports both USB2 and USB3 specifications and their corresponding USB connectors. As will be appreciated by one of skill in the art in possession of the present disclosure, the systems and methods of the present disclosure may operate to provide for the performance of serial communications via a USB 3.1 connector by only enabling USB2 specification functionality in that USB 3.1 connector, and repurposing the USB connections that are not required for USB2 specification functionality for use in configuring and/or performing serial communications. To provide a specific example, the USB connector 206 provided by the USB 3.1 connector may be advertised to a user as a USB 2 connector (e.g., a "high-speed" USB 2 connector rather than a "super-speed" USB 3.1 connector) so that the user will not expect USB 3.1 connector functionality from the USB connector 206 (as that functionality is not available due to the USB connection repurposing discussed above). However, one of skill in the art in possession of the present disclosure will appreciate how the teachings of the present disclosure may be enabled in a different manner while remaining within its scope as well.

Figure 6:
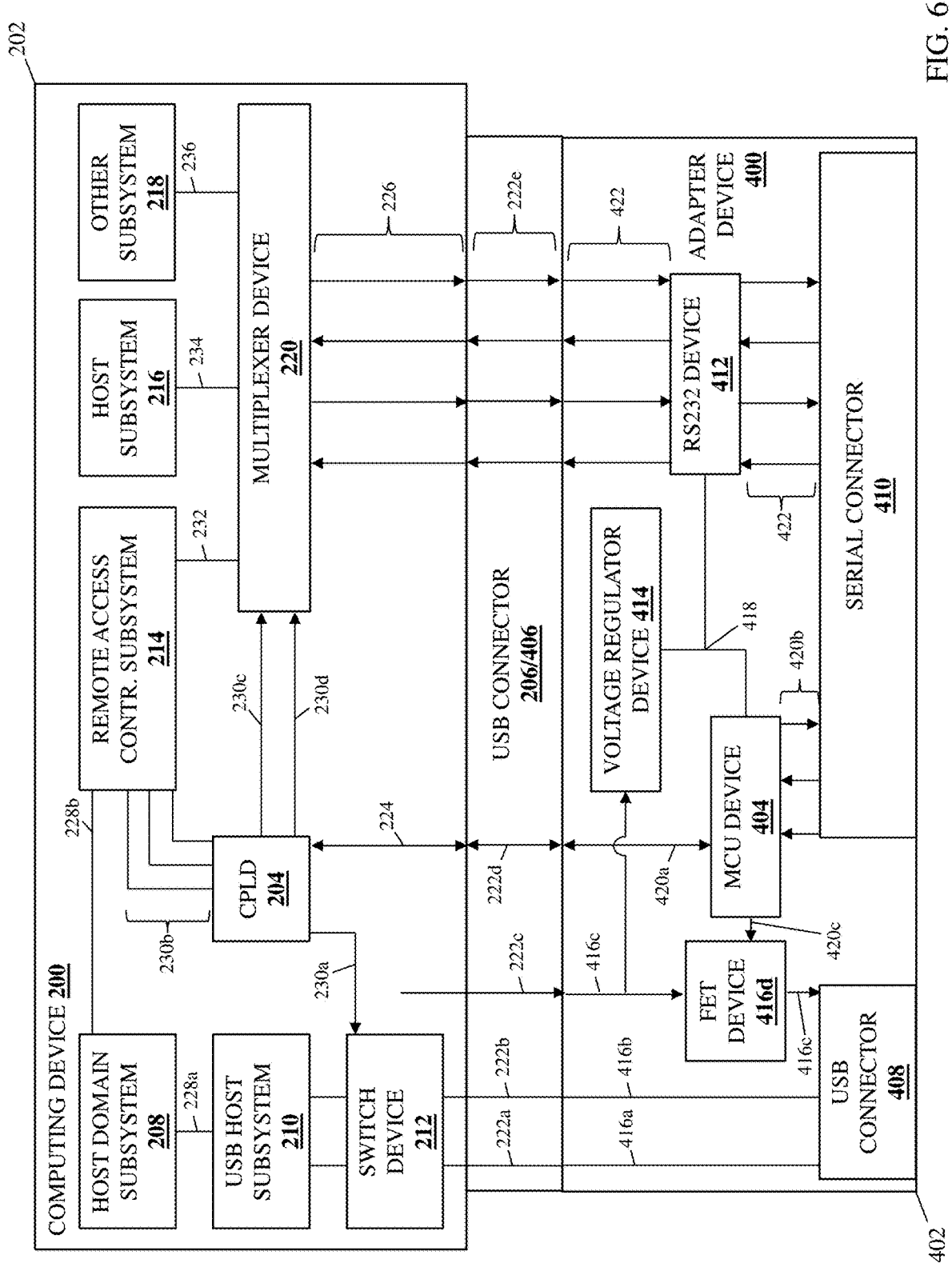
FIG. 6 is a schematic view illustrating an embodiment of the serial connector adapter device of FIG. 4 connected to the computing device of FIG. 2 to provide a serial connector adapter system.

The method 500 begins at block 502 where a serial connector adapter device is connected to a USB connector on a computing device. With reference to FIG. 6, in an embodiment of block 502, the serial connector adapter device 400 may be connected to the computing device 200 by connecting the USB connector 406 on the serial connector adapter device 400 to the USB connector 206 on the computing device 200, thus providing the serial connector adapter system of the present disclosure. As discussed above, the USB connector 406 on the serial connector adapter device 400 is configured to connect to the USB connector 206 on the computing device 200 and thus includes similar conventional USB connections as the USB connector 206, with the illustrated examples including the USB D− connection 222a, the USB D+ connection 222b, the 5V auxiliary power connection 222c, the USB ground drain connection 222d, and the plurality of USB transmitter/receiver pair connections 222e. In some embodiments, the serial connector adapter device 400 may be connected to the computing device 200 while the computing device is in a reduced power state such as a computing device auxiliary state (e.g., when the computing device 200 is in an Advanced Configuration and Power Interface (ACPI) S5 state and with the host (e.g., an operating system) "off"). However, in other embodiments, the serial connector adapter device 400 may be connected to the computing device 200 while the computing device is in a full power state such as a computing device main power state (with the computing device 200 in an ACPI S0 state and with the host (e.g., an operating system) "on").

In a specific embodiment, the computing device 200 may be configured in a particular manner that is based on its current power state. For example, the switch device 212 may be configurable to protect the USB host subsystem 210 from any non-USB compliant voltage bias on the USB connector 206 (e.g., from a device connected to the USB connector 206), as one of skill in the art in possession of the present disclosure will appreciate how the 5V auxiliary power connection 222c differs from a 5V main power domain that is typically used to supply power to the USB host subsystem 210 and USB connector 206. As such, in the computing device auxiliary state discussed above, the switch device 212 may be disabled in order to prevent the 5V auxiliary power connection 222c (which is enabled in ACPI S5) from biasing the de-energized USB host subsystem 210. Furthermore, in the computing device auxiliary state discussed above, the multiplexer device 220 may be disabled as well.

Furthermore, transition from the computing device auxiliary state discussed above to the computing device main power state discussed above may be accompanied by the CPLD 204 performing switch enablement operations that include asserting a signal on the switch enable connection 230a in order to enable the switch device 212. Furthermore, one of skill in the art in possession of the present disclosure will recognize how the opposite transition from the computing device main power state to the computing device auxiliary state may be accompanied by the CPLD 204 performing switch disablement operations that include de-asserting the signal on the switch enable connection 230a in order to disable the switch device 212.

Figure 7A:
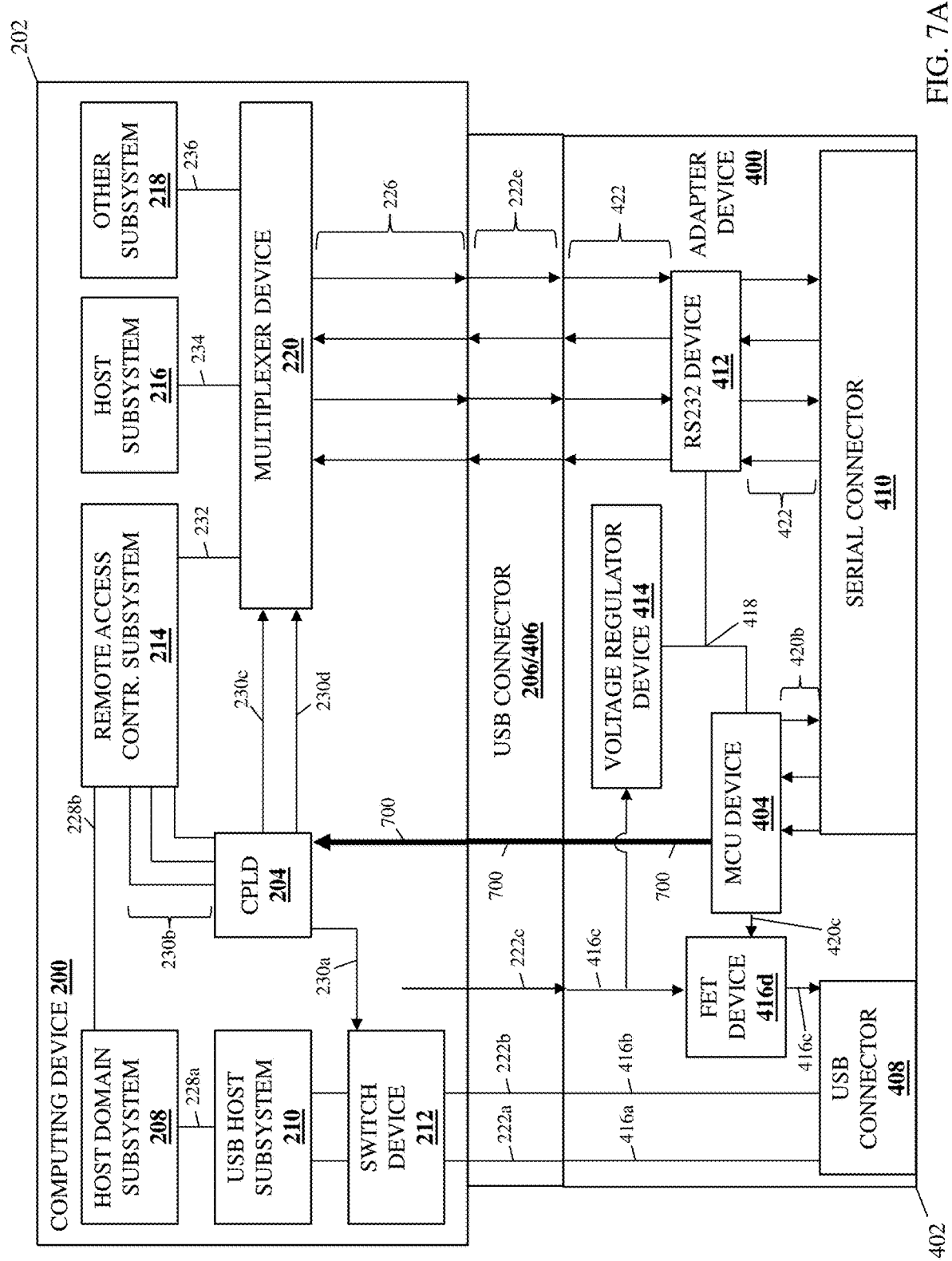
FIG. 7A is a schematic view illustrating an embodiment of the serial connector adapter system of FIG. 6 operating during the method of FIG. 5.

The method 500 then proceeds to block 504 where a serial communication configuration subsystem in the computing device identifies the serial connector adapter device via a USB ground drain connection in the USB connector. With reference to FIG. 7A, in an embodiment of block 504, the MCU device 404 may perform serial connector adapter device identification operations 700 that include transmitting serial connector adapter device identification information via the one-wire-data connection 420a, the USB ground drain connection 222d, and the one-wire-data connection 224, and to the CPLD 204. For example, the serial connector adapter device identification operations 700 may include the MCU device 404 "driving" the connection (i.e., the one-wire-data connection 420a, the USB ground drain connection 222d, and the one-wire-data connection 224) to the CPLD 204 "high" to identify the presence of the serial connector adapter device 400. However, while particular serial connector adapter device identification information is described, one of skill in the art in possession of the present disclosure how the USB ground drain connection 222d may be repurposed to provide for the identification of the serial adapter connector device 400 in a variety of manners that will fall within the scope of the present disclosure as well. For example, different serial connector adapter devices that adapt different connector types may identify themselves differently via configurable pin functions. As such, at block 504, the CPLD 204 will identify the serial connector adapter device 400 via the USB ground drain connection 222d.

Figure 7B:
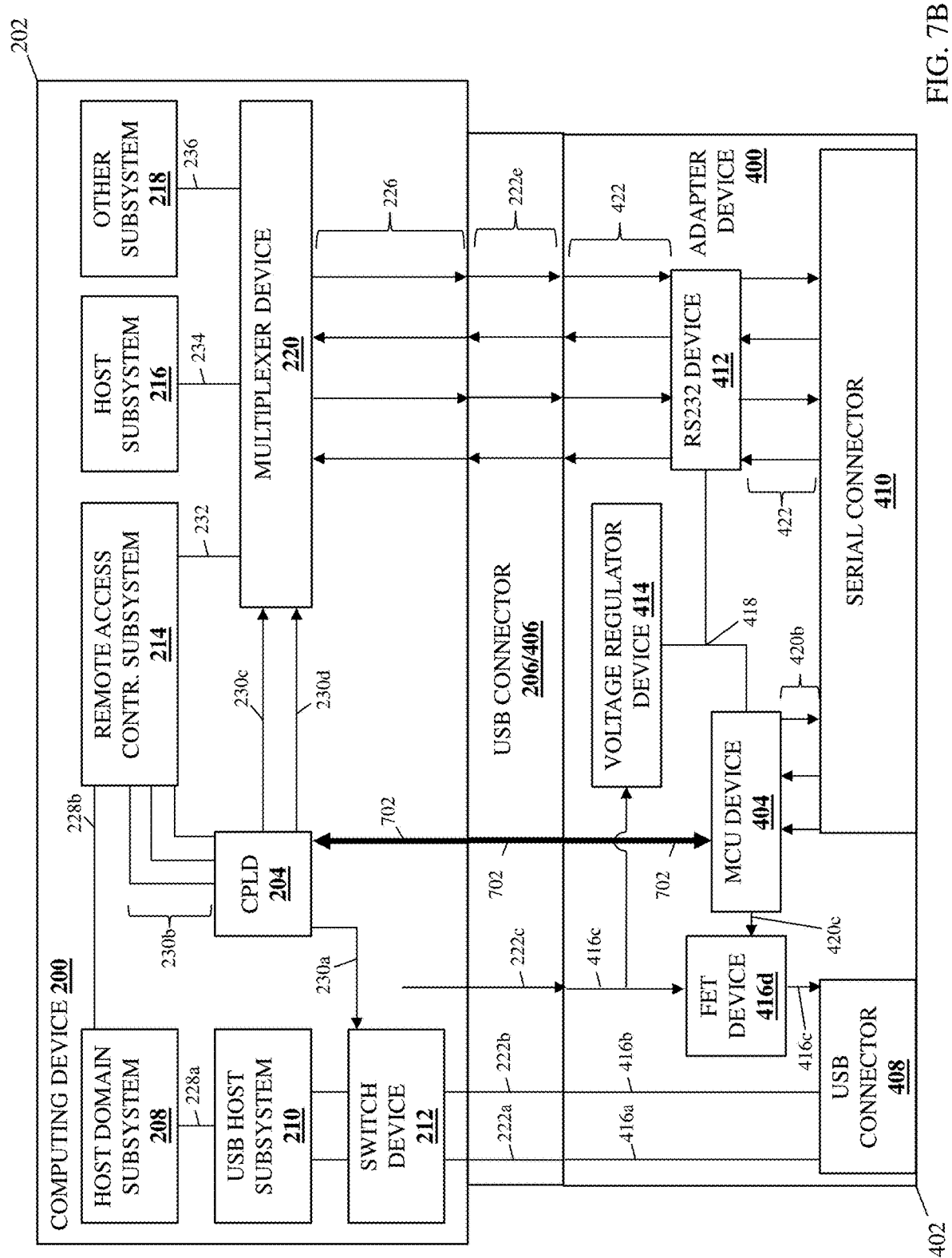
FIG. 7B is a schematic view illustrating an embodiment of the serial connector adapter system of FIG. 6 operating during the method of FIG. 5.

The method 500 then proceeds to block 506 where the serial communication configuration subsystem receives a request for serial communications with a serial communication subsystem in the computing device from the serial connector adapter device via bi-directional communications transmitted over the USB ground drain connection in the USB connector. With reference to FIG. 7B, in an embodiment of block 506, the MCU device 404 and the CPLD 204 may perform serial communication request operations 702 that include exchanging bi-directional communications via the one-wire-data connection 420a, the USB ground drain connection 222d, and the one-wire-data connection 224. As will be appreciated by one of skill in the art in possession of the present disclosure, the serial communication request operations 702 may include the MCU device 404 transmitting a serial connector adapter device identifier (e.g., a Stock Keeping Unit (SKU) for the serial connector adapter device 400), identifying a serial communication subsystem in the computing device 200 with which serial communications are requested (e.g., a Universal Asynchronous Receiver/Transmitter (UART) destination such as the remote access controller subsystem 214 in the specific examples below), as well as exchanging any other serial communication request information that would be apparent to one of skill in the art in possession of the present disclosure. However, while in the specific examples discussed below, the request for serial communications identifies the remote access controller subsystem 214, one of skill in the art in possession of the present disclosure will appreciate that serial communications may be requested (and subsequently enabled) with any serial communications subsystem while remaining within the scope of the present disclosure as well.

In some embodiments, the bi-directional communications exchanged by the MCU device 404 and the CPLD 204 via the one-wire-data connection 420a, the USB ground drain connection 222d, and the one-wire-data connection 224 may include the exchange of authentication information (e.g., via self-describing capability handshake operations) so that the CPLD 204 may authenticate the serial connector adapter device 400 for use with the computing device 200. However, while particular bi-directional communications are described, one of skill in the art in possession of the present disclosure how the USB ground drain connection 222d may be repurposed to perform a variety of bi-directional communications that will fall within the scope of the present disclosure as well, and those bi-directional communications may be performed at any time during the method 400 to enable the serial communications described herein. For example, power supply to the USB connector 408 (e.g., the USB "passthrough" port on the serial connector adapter device 400) via the 5V auxiliary power connection 222c and the 5V auxiliary power connection 416c may only be enabled when the host (e.g., an operating system) in the computing device 200 is "on", and in a specific example the bi-directional communications discussed above may include the CPLD 204 informing the MCU device 404 that the host in the computing device 200 is "on", with the MCU device 404 enabling power to the USB connector 408 via the 5V auxiliary power connection 222c and the 5V auxiliary power connection 416c in response by activating the FET device 416d using the FET control connection 420c. As such, at block 506, the CPLD 204 will receive a request for serial communications with a serial communication subsystem from the serial connector adapter device 400 via the USB ground drain connection 222d.

Figure 7C:
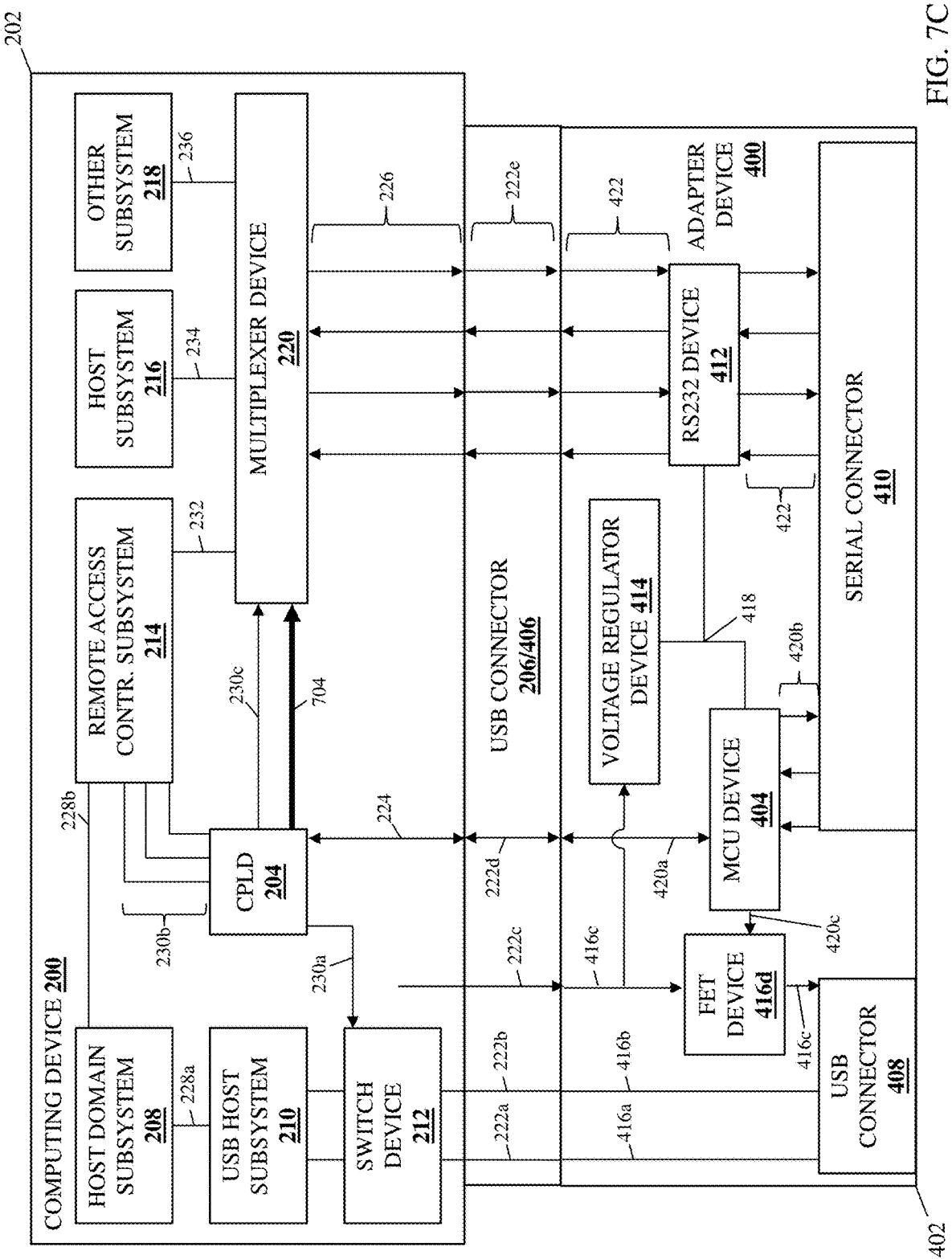
FIG. 7C is a schematic view illustrating an embodiment of the serial connector adapter system of FIG. 6 operating during the method of FIG. 5.

The method 500 then proceeds to block 508 where the serial communication configuration subsystem configures the serial communications subsystem to perform serial communications via a serial connector in the serial connector adapter device using one or more USB transmitter/receiver pair connections in the USB connector. With reference to FIG. 7C, in an embodiment of block 508 and in response to receiving the request for serial communications with a serial communication subsystem at block 506, the CPLD 204 may perform multiplexer enablement operations 704 that include transmitting a multiplexer enablement command via the multiplexer enable connection 230d in order to enable operations of the multiplexer device 220. While not illustrated or discussed in detail below, one of skill in the art in possession of the present disclosure will recognize how the CPLD 204 may perform multiplexer disablement operations that include transmitting a multiplexer disablement command via the multiplexer enable connection 230d in order to disable operations of the multiplexer device 220 in the event the serial connector adapter device 400 is disconnected from the computing device 200, which may operate to prevent an auxiliary-powered USB device that is connected to the USB connector 206 from driving voltage to a UART destination (e.g., one of the serial communication subsystems in the computing device).

Figure 7D:
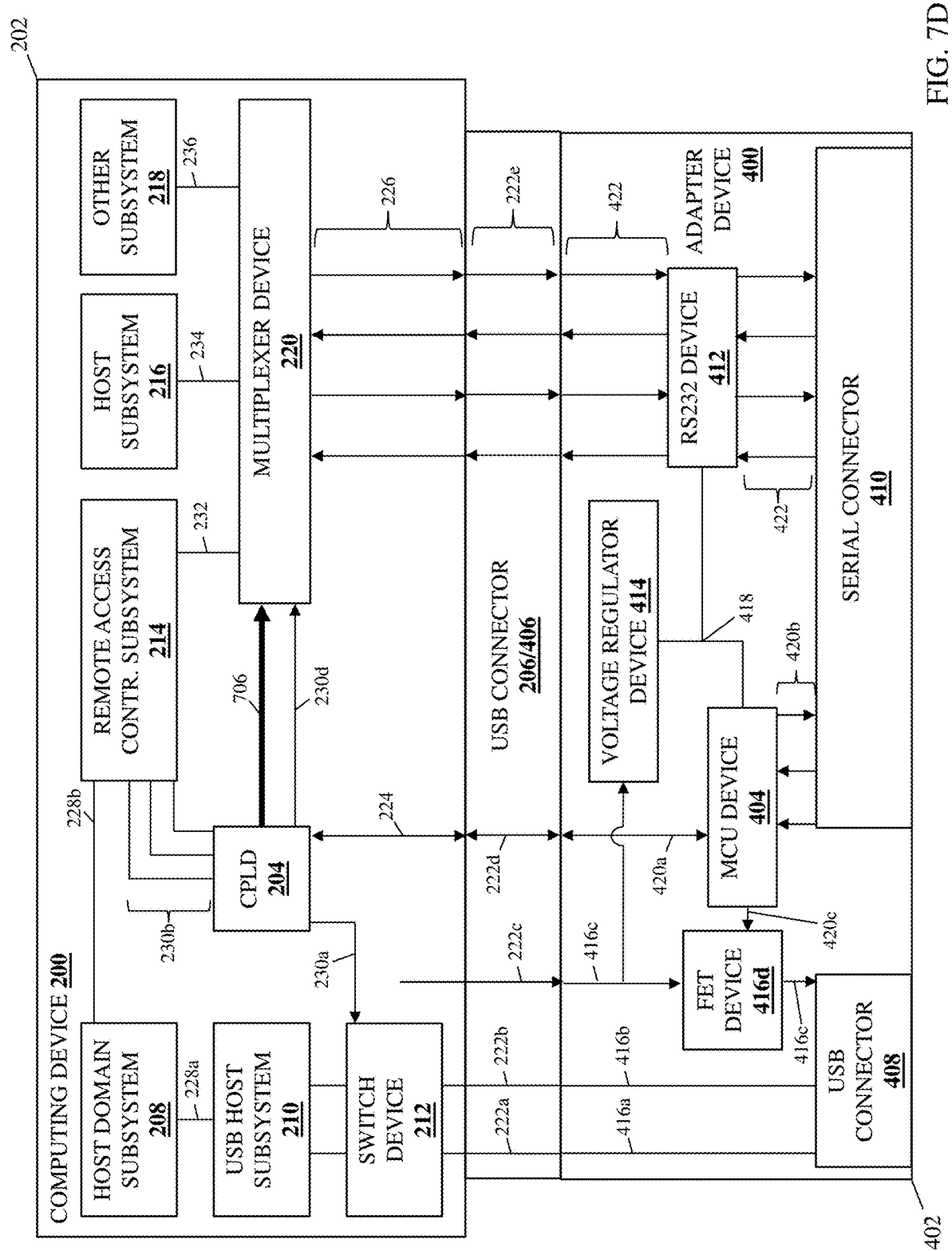
FIG. 7D is a schematic view illustrating an embodiment of the serial connector adapter system of FIG. 6 operating during the method of FIG. 5.

With reference to FIG. 7D, in an embodiment of block 508 and following the enablement of the multiplexer device 220, the CPLD 204 may perform multiplexer configuration operations 706 that include configuring the multiplexer device 220 via the multiplexer select connection 230c in order to enable/route serial communications by the serial communication subsystem requested at block 506. As discussed above, while the examples herein describe configuring the multiplexer device 220 to enable/route serial communications with the remote access controller device 214, the enablement of serial communications with any serial communication subsystems will fall within the scope of the present disclosure as well. As such, at block 506, the CPLD 204 may configure the remote access controller subsystem 214 to perform serial communications via the serial connector adapter device 400 by configuring the multiplexer device 220.

Figure 7E:
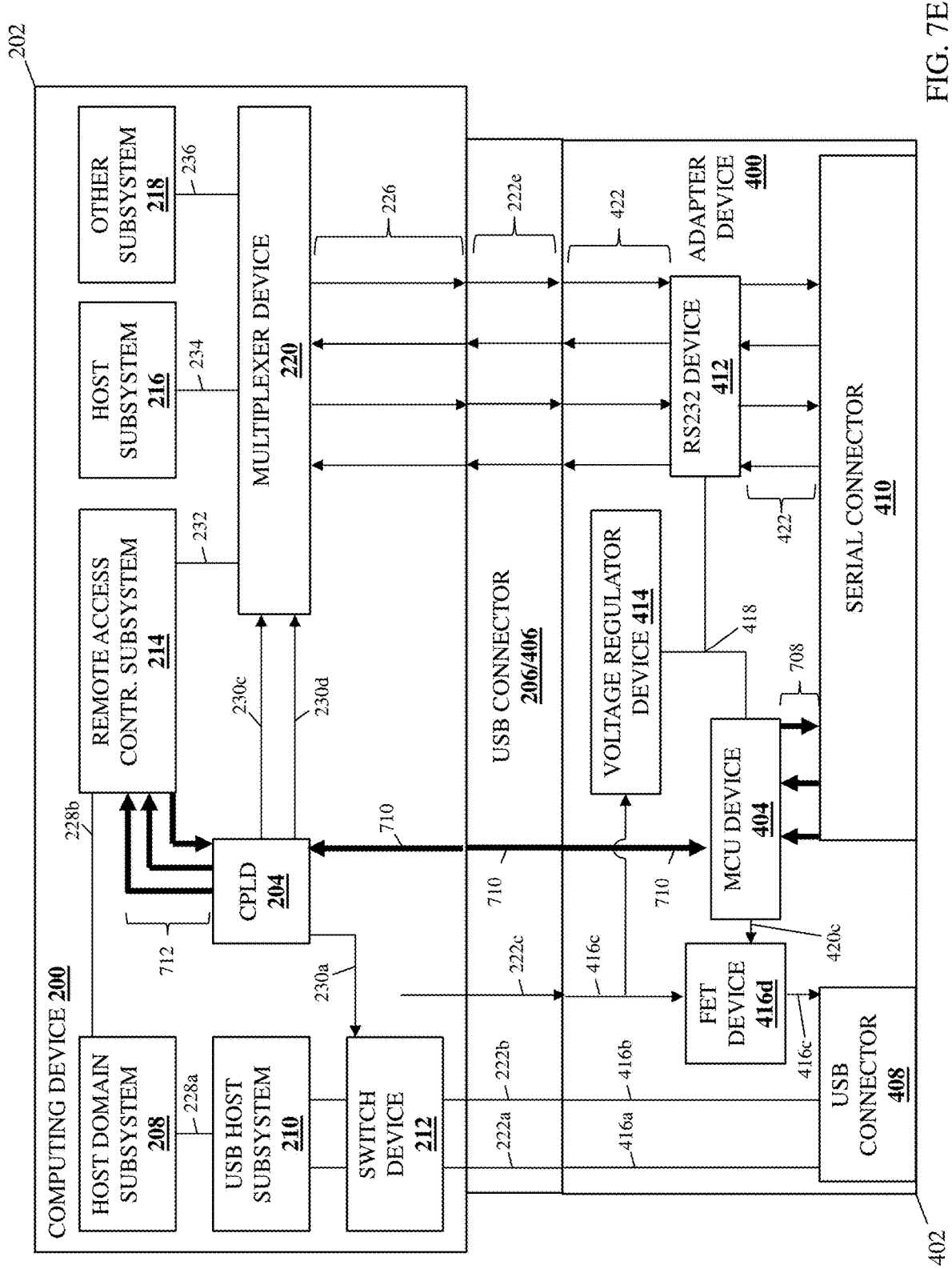
FIG. 7E is a schematic view illustrating an embodiment of the serial connector adapter system of FIG. 6 operating during the method of FIG. 5.

The method 500 then proceeds to block 510 where the serial communication subsystem performs serial communications with via the serial connector. In an embodiment, following the configuration of the multiplexer device 220, the CPLD 204 may inform the MCU device 404 that the remote access controller subsystem 214 is configured for serial communications, and in response the MCU device 404 may enable the RS232 device 412 to perform the UART transmit/receive operations discussed below. Furthermore, as illustrated in FIG. 7E, a device connected to the serial connector 410 may then being transmitting and/or receiving serial communications, and at least some of those serial communications may include modem control serial communications that are provided by the serial connector 410 to the MCU device 404 during modem control serial communication transmission operations 708 using the modem control connections 420b. In response to receiving the modem control serial communications, the MCU device 404 may perform tunneling operations 710 to tunnel the modem control serial communications via the one-wire-data connection 420a, the USB ground drain connection 222d, and the one-wire-data connection 224. The CPLD 204 may then receive the tunneled modem control serial communications, and perform modem control serial communication transmission operations 712 to transmit the modem control serial communications to the remote access control subsystem 214 via the modem control connections 230b.

Figure 7F:
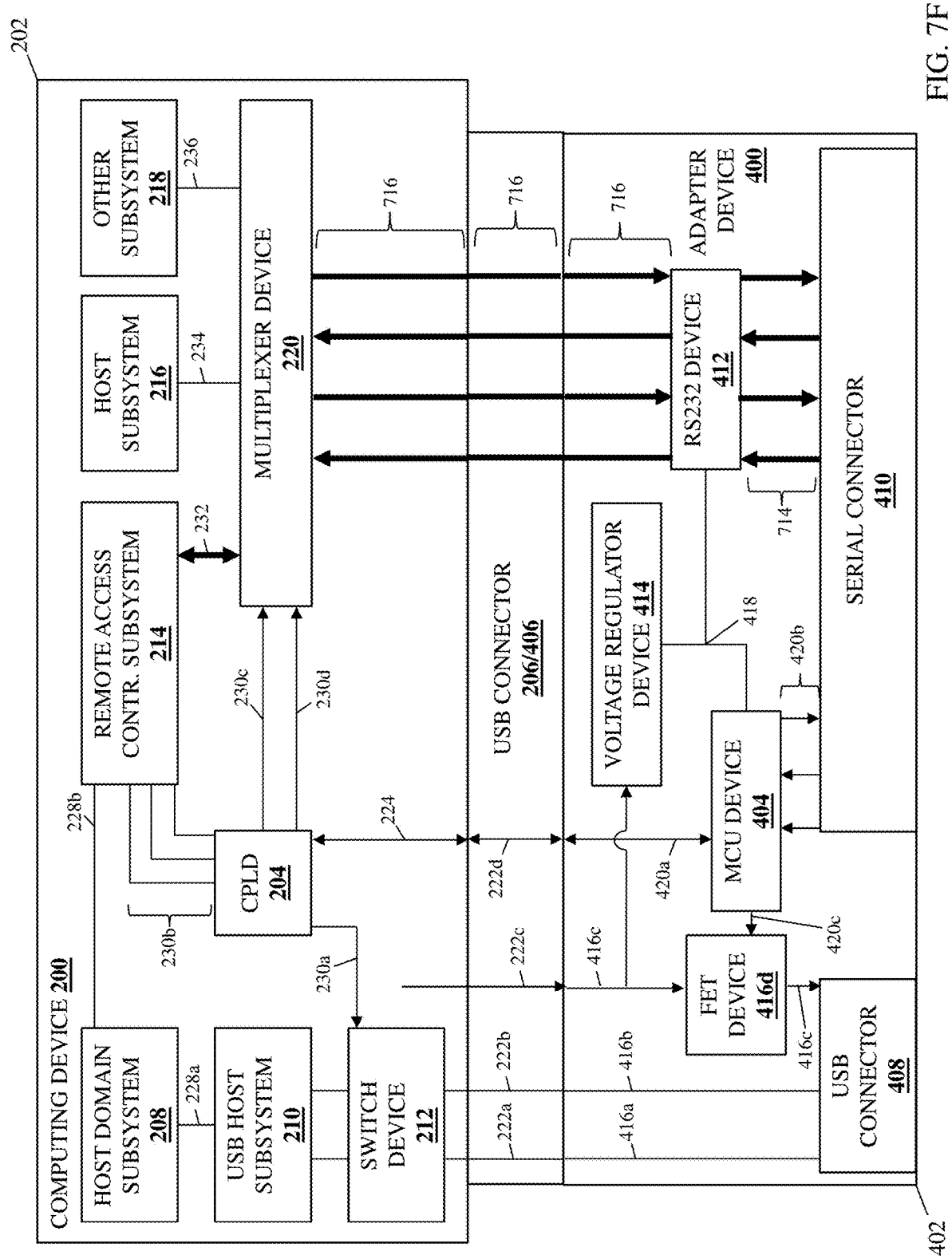
FIG. 7F is a schematic view illustrating an embodiment of the serial connector adapter system of FIG. 6 operating during the method of FIG. 5.

With reference to FIG. 7F, at least some of the serial communications transmitted and/or received by the device connected to the serial connector 410 may include UART serial communications that are provided by the serial connector 410 to the RS232 device 412 during UART serial communication transmission operations 714 using the UART connections 422. The RS232 device 412 may then perform UART serial communication transmission operations 716 to transmit the UART serial communications received from the serial connector 410 via the UART connections 422, the USB transmitter/receiver pair connections 222e, and the UART connections 226 to the multiplexer device 220. As can be seen in FIG. 7F, the configuration of the multiplexer device 220 at block 506 will cause the multiplexer device 220 to perform UART serial communication routing operations 718 to route the UART serial communications received from the RS232 device 412 to the remote access controller device 214 via the UART connections 232. As such, the serial connector adapter device 400 enables serial communications between a device connected to the serial connector 410 and the remote access controller subsystem 214 via USB transmitter/receiver pair connections in the USB connector 206. In different embodiments, the UART serial communications may include host communications, remote access controller subsystem user communications (remote access controller administrator communications), remote access controller subsystem debug communications (e.g., boot progress communications, fault communications, certificate-based debug communications, etc.), CPLD debug communications (low level hardware state communications), and/or any of a variety of other serial communications that would be apparent to one of skill in the art in possession of the present disclosure.

As will be appreciated by one of skill in the art in possession of the present disclosure, the serial connector adapter device of the present disclosure differs from conventional USB-to-serial dongles that, when connected to a USB port on a computing device with a running host (i.e., a BIOS and an operating system), allow the host to see the serial port on that USB-to-serial dongle as a plug-and-play serial-class USB device that may be used for serial input/ output functionality, but that are limited to serial communications with a x86 host subsystem via a host port when the computing device is fully powered and the operating system has loaded. As such, conventional USB-to-serial dongles cannot enable serial communications with subsystems like the remote access controller subsystem described above (or similar subsystems like Smart Network Interface Controllers (SmartNICS), CPLDs, and/or other host-independent subsystems) that are available via a serial port when the computing device is in a low (or no) power state and the operating system is not loaded.

Furthermore, one of skill in the art in possession of the present disclosure will recognize that the serial connector adapter device of the present disclosure is "hot-pluggable" (i.e., may be connected to the computing device 200 while the computing device is fully powered and its operating system is running while still providing the functionality described above), which allows a user to enable serial communications "on-demand" via a USB connector on the computing device 200. However, one of skill in the art in possession of the present disclosure will also recognize that the serial connector adapter device of the present disclosure may be connected to a computing device in a "lights out" situation (in which the computing device is in a low power/ no power state) while still being operable to provide the full flow control/modem control serial communication support described above.

As such, the serial connector adapter device of the present disclosure operates without losing any legacy modem/flow control signals, removes the need for manufacturing support in order to enable serial ports on some chassis, may enable serial communications in systems that did not previously support serial communications, may be implemented in computing devices with little to no cost, has higher reliability relative to convention cabled serial ports, does not require the use of a PCIe slot to enable serial communications, and/or provides other benefits that would be apparent to one of skill in the art in possession of the present disclosure.

Thus, systems and methods have been described that provide for the performance of serial communications with a serial communication subsystem in a computing device via a USB connector on that computing device, with support for modem control communications, as well as "lights out" serial communications with both host and non-host subsystems in the computing device. For example, the serial connector adapter system of the present disclosure may include a serial connector adapter device connected to a computing device. The serial connector adapter device includes a serial communication request subsystem coupled to a serial connector and a first USB connector. The computing device includes a second USB connector connected to the first USB connector, a serial communication subsystem coupled to the second USB connector, and a serial communication configuration subsystem coupled to the second USB connector and the serial communication subsystem. The serial communication configuration uses a USB ground drain connection in the first and second USB connectors subsystems to identify the serial connector adapter device and perform bi-directional communications to receive a request for serial communications with the serial communication subsystem and, in response, configures the serial communication subsystem to perform serial communications via the serial connector using USB transmitter/ receiver pair connections in the first and second USB connectors. As such, a USB connector may be utilized to perform serial communications without the limitations of conventional systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A serial connector adapter system, comprising:
   a serial connector adapter device including:
      a serial connector;
      a first Universal Serial Bus (USB) connector; and
      a serial communication request subsystem coupled to the serial connector and the first USB connector; and
   a computing device including:
      a second USB connector that is connected to the first USB connector;
      a serial communication subsystem that is coupled to the second USB connector; and
      a serial communication configuration subsystem that is coupled to the second USB connector and the serial communication subsystem, wherein the serial communication configuration subsystem is configured to:
         identify, via a USB ground drain connection in the first USB connector and the second USB connector, the serial connector adapter device;
         receive, using bi-directional communications with the serial communication request subsystem via the USB ground drain connection in the first USB connector and the second USB connector, a request for serial communications with the serial communication subsystem; and
         configure, in response to receiving the request for serial communications with the serial communication subsystem, the serial communication subsystem to perform serial communications via the serial connector using one or more USB transmitter/receiver pair connections in the first USB connector and the second USB connector.

2. The system of claim 1, wherein the serial communication configuration subsystem is configured to:
   authenticate, using the bi-directional communications with the serial communication request subsystem via the USB ground drain connection in the first USB connector and the second USB connector, the serial connector adapter device.

3. The system of claim 1, wherein the second USB connector is a USB 3.1 connector.

4. The system of claim 1, wherein the serial communication subsystem is a remote access controller subsystem.

5. The system of claim 1, wherein the serial connector adapter device includes a third USB connector that is coupled directly to the first USB connector.

6. The system of claim 5, wherein the serial communication configuration subsystem is configured to:
   determine that the computing device is operating above a power threshold; and
   configure, in response to determining that the computing device is operating above the power threshold, the serial connector adapter device to pass USB communications that are received at the first USB connector via the second USB connector to the third USB connector.

7. An Information Handling System (IHS), comprising:
a processing system; and
a memory system that is coupled to the processing system and that includes instructions that, when executed by the processing system, cause the processing system to provide a serial communication configuration engine that is configured to:
identify, via a Universal Serial Bus (USB) ground drain connection in a first USB connector coupled to the processing system and a second USB connector that is connected to the first USB connector, a serial connector adapter device that includes the second USB connector;
receive, using bi-directional communications with the serial connector adapter device via the USB ground drain connection in the first USB connector and the second USB connector, a request for serial communications with a serial communication subsystem that is coupled to the processing system; and
configure, in response to receiving the request for serial communications with the serial communication subsystem, the serial communication subsystem to perform serial communications via a serial connector included on the serial connector adapter device using one or more USB transmitter/receiver pair connections in the first USB connector and the second USB connector.

8. The IHS of claim 7, wherein the serial communication configuration engine is configured to:
authenticate, using the bi-directional communications with the serial connector adapter device via the USB ground drain connection in the first USB connector and the second USB connector, the serial connector adapter device.

9. The IHS of claim 7, wherein the first USB connector is a USB 3.1 connector.

10. The IHS of claim 7, wherein the serial communication subsystem is a remote access controller subsystem.

11. The IHS of claim 7, wherein the serial connector adapter device includes a third USB connector that is coupled directly to the second USB connector.

12. The IHS of claim 1, wherein the serial communication configuration engine is configured to:
determine that a host subsystem coupled to the processing system is operating above a power threshold; and
configure, in response to determining that the host subsystem is operating above the power threshold, the serial connector adapter device to pass USB communications that are received at the second USB connector via the first USB connector to the third USB connector.

13. The IHS of claim 7, wherein the serial communication configuration engine is configured to:
receive, via the USB ground drain connection in the first USB connector and the second USB connector, one or more signals tunneled by the serial connector adapter device.

14. A method for performing serial communications, comprising:
identifying, by a serial communication configuration subsystem in a computing device via a Universal Serial Bus (USB) ground drain connection in a first USB connector on the computing device and a second USB connector that is connected to the first USB connector, a serial connector adapter device that includes the second USB connector;
receiving, by the serial communication configuration subsystem using bi-directional communications with the serial connector adapter device via the USB ground drain connection in the first USB connector and the second USB connector, a request for serial communications with a serial communication subsystem that is included in the computing device; and
configuring, by the serial communication configuration subsystem in response to receiving the request for serial communications with the serial communication subsystem, the serial communication subsystem to perform serial communications via a serial connector included on the serial connector adapter device using one or more USB transmitter/receiver pair connections in the first USB connector and the second USB connector.

15. The method of claim 14, further comprising:
authenticating, by the serial communication configuration subsystem using the bi-directional communications with the serial connector adapter device via the USB ground drain connection in the first USB connector and the second USB connector, the serial connector adapter device.

16. The method of claim 14, wherein the first USB connector is a USB 3.1 connector.

17. The method of claim 14, wherein the serial communication subsystem is a remote access controller subsystem.

18. The method of claim 14, wherein the serial connector adapter device includes a third USB connector that is coupled directly to the second USB connector.

19. The method of claim 18, further comprising:
determining, by the serial communication configuration subsystem, that the computing device is operating above a power threshold; and
configuring, by the serial communication configuration subsystem in response to determining that the computing device is operating above the power threshold, the serial connector adapter device to pass USB communications that are received at the second USB connector via the first USB connector to the third USB connector.

20. The method of claim 14, further comprising:
receiving, by the serial communication configuration subsystem via the USB ground drain connection in the first USB connector and the second USB connector, one or more signals tunneled by the serial connector adapter device.

* * * * *

UNITED STATES PATENT AND TRADEMARK OFFICE
CERTIFICATE OF CORRECTION

| | |
|---|---|
| PATENT NO. | : 11,899,600 B2 |
| APPLICATION NO. | : 17/583604 |
| DATED | : February 13, 2024 |
| INVENTOR(S) | : Lambert et al. |

It is certified that error appears in the above-identified patent and that said Letters Patent is hereby corrected as shown below:

In the Claims

Claim 12, Column 15, Line 45, "The IHS of claim 1" should be changed to -- The IHS of claim 11 --.

Signed and Sealed this
Sixteenth Day of April, 2024

Katherine Kelly Vidal
Director of the United States Patent and Trademark Office